United States Patent Office 3,544,343
Patented Dec. 1, 1970

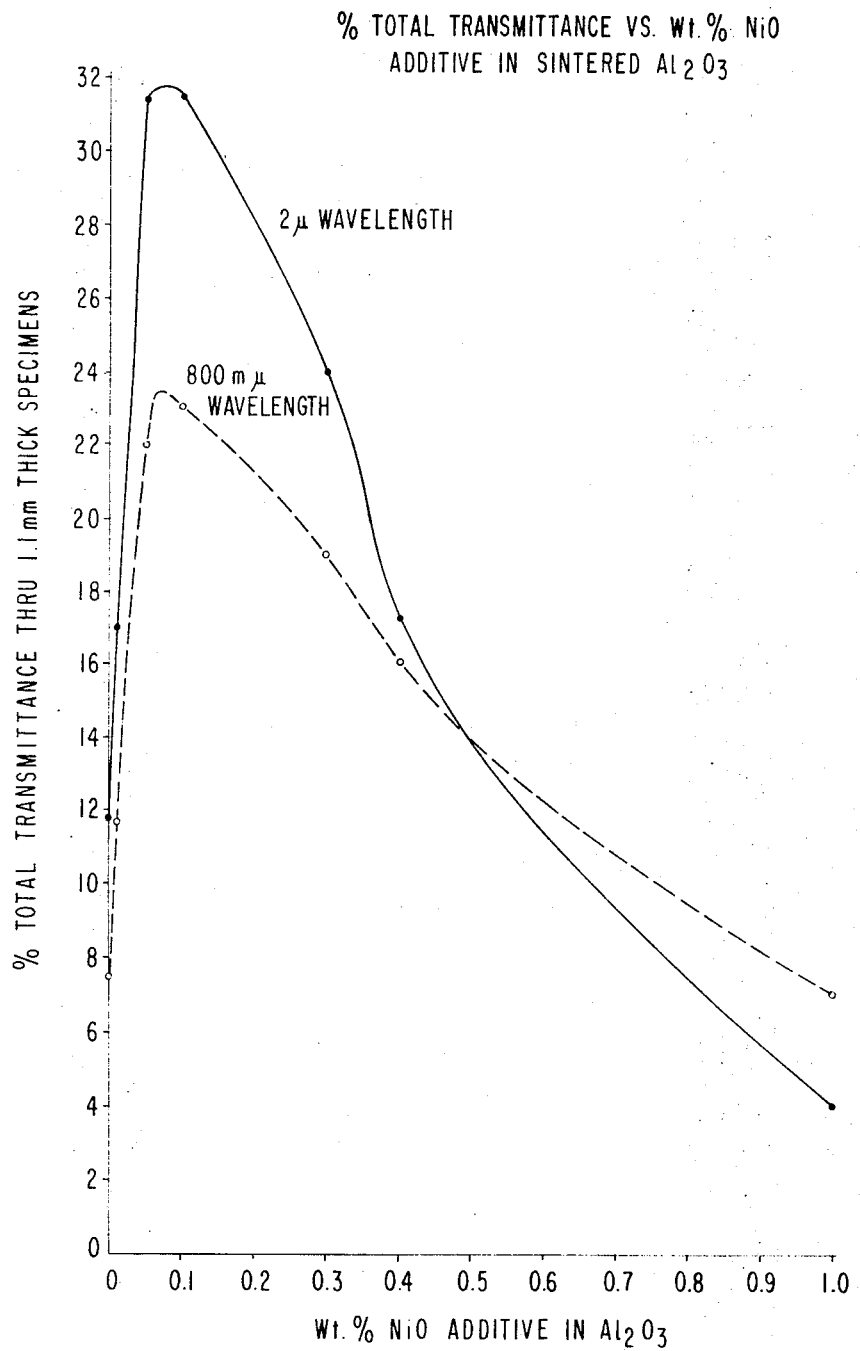

3,544,343
HIGH DENSITY ALUMINA AND METHOD FOR PRODUCING IT
Irwin M. Lachman, Corning, N.Y., assignor to Corning Glass Works, Corning, N.Y., a corporation of New York
Continuation-in-part of application Ser. No. 506,120, Nov. 2, 1965. This application Feb. 2, 1967, Ser. No. 613,509
Int. Cl. C04b 35/10, 35/44
U.S. Cl. 106—65
10 Claims

ABSTRACT OF THE DISCLOSURE

High density alumina articles of improved translucency formed by mixing high purity alumina with from 0.01 up to less than 0.5% by weight of nickel ions, calculated as nickel oxide and sintering the composition at from 1500°–1900° C., articles having an improved modulus of rupture obtained by coating with compression glaze. Sintering is conducted in oxygen containing atmosphere, e.g., air. Optimum results are obtained with 0.01 to 0.4% by weight nickel ions. Nickel added as any compound convertible to oxide on sintering.

CROSS REFERENCE TO RELATED APPLICATION

This application is a continuation-in-part of application Ser. No. 506,120, now abandoned of Irwin M. Lachman, filed Nov. 2, 1965 for "High Density Alumina and Method for Producing It."

BACKGROUND OF THE INVENTION

Field of the invention

The present invention relates to an improved high density alumina product and to a process for producing it. More particularly, the invention is directed to the production of alumina bodies having a density which is indistinguishable from theoretical density by ordinary methods of measurement. The products of the invention are characterized by high density, high strength, thermal stability at elevated temperatures, regular grain growth and improved translucency. The materials are useful in the manufacture of translucent high temperature articles.

SUMMARY OF THE INVENTION

According to the present invention, it has been found that improved alumina bodies may be produced by incorporating small amounts of nickel oxide in bodies of high purity alumina and firing at elevated temperatures in an oxygen containing atmosphere, such as air. More specifically, it has been found that adding to high purity alumina from 0.01 up to less than 0.5% by weight of nickel ions, calculated as nickel oxide, and then sintering the composition at a temperature in the range of from 1500° to 1900° C. yields improved high density alumina articles which are stable at high temperatures, exhibit regular grain growth and have increased translucency. Optimum results are achieved where the addition of nickel ions, calculated as nickel oxide, is in the range of from 0.01 to 0.4%.

It has also been found that the strength of the products may be greatly enhanced by applying to their surfaces an aluminosilicate compression glaze as more fully described hereinafter.

BRIEF DESCRIPTION OF THE DRAWING

The single figure of the drawing is a graph presenting the plot of the percent transmittance of light through a 1.1 mm. thick specimen vs. the weight percent of nickel oxide additive in a sintered alumina specimen. The figure illustrates the improved translucency of articles prepared in accordance with the invention.

DESCRIPTION OF THE PREFERRED EMBODIMENTS

The preferred method for carrying out the invention comprises first, intimately mixing a nickel compound with high purity alumina. The nickel may be added in the form of any nickel containing compound or composition which yields nickel oxide upon being fired. The alumina starting material is preferably of high purity; alumina having a purity of 99.9% or higher is satisfactory. The starting materials are preferably provided in finely divided form and their admixture may be facilitated by the use of a liquid carrier which is nonreactive and which is evaporated or otherwise driven off during a preliminary drying step or during firing. In the event that the nickel compound is soluble in one or more liquid carriers, it may be convenient to use solutions of the compound in such liquids to obtain thorough mixing.

The ingredients are preferably mixed in a blender, the batch is dried and samples are dry-pressed into any desired shape, such as tubular envelopes, plates, bars or the like.

The dry-pressed material may then be subjected to a brief prefiring operation at a relatively low temperature, i.e., low with respect to the final firing or sintering temperature. For example, the specimens may be prefired in air at a temperature of about 1330° C. for about one minute or less. The purpose of the prefiring in an oxidizing atmosphere is to burn out residual carrier or binder material, to convert the metal compound to the oxide and to develop sufficient strength in the article to permit handling.

The final firing is carried out at a temperature in the range of from 1500° to 1900° C. The firing is conducted in an oxygen-containing atmosphere, preferably air.

The present invention will be more fully understood in light of the following detailed examples which represent certain preferred embodiments of the invention and the best mode that has been contemplated for carrying it out.

A series of batches were prepared by adding nickelous carbonate, in the form of Baker reagent, to a high purity alumina (Alucer MCB) having a particle size of one micron and a purity of 99.97%. The nickelous carbonate was mixed with acetone and added to the alumina in a blender. The mixture was then agitated until the ingredients were thoroughly mixed. The batch was removed from the blender and dried and was then drypressed into discs.

A number of specimens containing the nickel additives were then fired in air. The results for various concentrations of additive and firing schedules are reported in Table I.

Some of the air fired specimens were provided with an aluminosilicate compression glaze.

Aluminosilicate glasses of the following compositions were chosen for the application of the compression glazes.

TABLE I—AIR FIRED ALUMINA, WITH NiO ADDITIONS

| Specimen composition | Firing conditions | Color | Microstructure | Percent transmittance * | |
|---|---|---|---|---|---|
| | | | | $2\mu$ | $800\ m\mu$ |
| No NiO | 1,700° C., 2 hours | White E | Exaggerated grain growth | 11.8 | 7.5 |
| 0.01%, NiO | 1,700° C., 2 hours, air | Greenish tint | do | 17.0 | 11.7 |
| 0.05%, NiO | do | Yellowish green | Grain size, 6–10 microns | 31.4 | 22.0 |
| 0.10%, NiO | do | do | do | 31.5 | 23.0 |
| 0.3%, NiO | do | do | do | 24.0 | 19.0 |
| 0.4%, NiO | do | do | do | 17.2 | 16.0 |
| 1.0%, NiO | do | Bluish-green | do | 4.0 | 7.0 |
| 5%, NiO | do | Purple | do | 0.0 | 9.0 |

* Through 1.1 mm. thick specimens.

Pure alumina specimens fired in the same manner as the specimens containing additive exhibit exaggerated grain growth and are only slightly translucent, whereas as will be seen in Table I, specimens containing from greater than 0.01% to 0.4% of nickel oxide exhibit regular grain growth. The specimens containing from 0.01% to 0.4% nickel oxide have significantly improved translucency.

Referring to the drawing, there is shown a graph which is a plot of percent total light transmittance vs. percent by weight of nickel oxide additive in the sintered alumina specimens. Specimens prepared in accordance with the invention and having various concentrations of nickel oxide were tested for light transmittance on Beckman DK–2 Spectrophotometer No. 124715. The specimens were 1.1 mm. thick. Spectrophotometer curves were obtained for specimens containing 0.0%, 0.01%, 0.05%, 0.10%, 0.30%, 0.40%, 1.0% and 5.0% nickel oxide.

| | Glaze composition, percent | |
|---|---|---|
| | Glaze A | Glaze B |
| Glass constituent: | | |
| $SiO_2$ | 65.6 | 66.0 |
| $Al_2O_3$ | 9.0 | 23.0 |
| $B_2O_3$ | 15.3 | |
| $Li_2O$ | 1.1 | |
| $Na_2O$ | 2.1 | |
| $K_2O$ | 3.1 | |
| $CaO$ | | 11.0 |
| $BaO$ | 3.0 | |
| $KCl$ | 1.0 | |

The glasses were melted cooled, ground and dispersed in an organic vehicle to form a slurry. The doped alumina rods were then dipped into the slurry and fired at about 1500° C. for a half hour in air.

The results of modulus of rupture (MOR) tests and information concerning grain size are reported in Table II.

TABLE II.—MOR OF GLAZED AND UNGLAZED AIR FIRED ARTICLES

| Specimen composition | Firing information, ° C., hrs., atmos. | Glaze or control | Surface treatment | Abraded MOR, p.s.i. | No. of specimens broken | Maximum grain size microns |
|---|---|---|---|---|---|---|
| Alumina containing 0.3% NiO | 1,600, 4, air ¹ | Control | Surface ground, edges beveled | 31,000 | 5 | 20 |
| Do | 1,600, 4, air | Glaze A | do | 49,000 | 5 | |
| Do | 1,600, 4, air | Glaze B | do | 54,000 | 5 | |

¹ "Air" atmosphere means exposed to the products of combustion and excess air.

Using the data from the spectrophotometer curves, the percent total transmittance vs. weight percent of nickel oxide was plotted for light having a wave length of 2 microns (solid line) and 800 millimicrons (broken line).

The resulting plots, shown in the graph, clearly demonstrate the correlation between improved translucency and a nickel oxide content of from 0.01% to less than 0.5%, preferably from 0.01% to 0.4% by weight.

Specimens were prepared as described above, but using ferric nitrate and a 50% solution of manganous nitrate as additives in place of the nickel compound. These ions were selected because their similar ionic size and valence suggested that they might have the same effect on the alumina. When fired in a similar manner, the specimens containing the iron and manganese additions result in alumina articles having exaggerated grain growth and poor translucency.

Air fired specimens in the form of dry-pressed bars about three inches long and a half inch wide and having a thickness of about 0.02 inch were then subjected to strength measurements in both the glazed and unglazed condition. A specimen composition comprising alumina containing 0.3% by weight of nickel oxide was tested.

The embodiments of the invention in which an exclusive property or privilege is claimed are defined as follows:

1. A method for producing high density alumina bodies of improved translucency and regular grain growth comprising mixing finely divided high purity alumina particles, said alumina having a purity of at least 99.9%, with from 0.05% to 0.4% by weight of nickel, calculated as nickel oxide, forming the mixture to a desired shape and firing in an oxygen-containing atmosphere at a temperature in the range of from 1500° to 1900° C. until a self-supporting, fired, high density article having a percentage transmittance of light at two microns of at least 17.2% and at 800 millimicrons of at least 16.0% through a 1.1 mm. thick specimen is obtained.

2. The method of claim 1 wherein the firing is conducted in air.

3. The method of claim 1 wherein said nickel is mixed with said alumina by incorporating a compound of said nickel in a liquid vehicle and mixing the resulting liquid composition with said alumina.

4. The method of claim 1 wherein said article is prefired in air before firing, said prefiring being carried out at a temperature below the firing temperature.

5. The method of claim 1 further comprising coating the fired article with an alumina silicate compression glaze.

6. A high density alumina article consisting essentially of sintered high purity alumina, said alumina having a purity of at least 99.9%, containing from 0.05% to 0.4% by weight of nickel, calculated as nickel oxide, and characterized by regular grain growth, improved translucency characterized by a percentage transmittance of light at two microns of at least 17.2% and at 800 millimicrons of at least 16.0% through a 1.1 mm. thick specimen and by a density indistinguishable from theoretical by ordinary methods of measurement.

7. The article of claim 6 wherein the article is further provided with an aluminosilicate compression glaze coating.

8. A method as in claim 1 wherein said high density alumina body is characterized by a grain size of from about 6 to about 10 microns.

9. A high density alumina article as in claim 6 further characterized by a grain size of from about 6 to about 10 microns.

10. The process of claim 1 wherein said alumina particles have a size of about one micron.

References Cited

UNITED STATES PATENTS

| | | | |
|---|---|---|---|
| 2,678,889 | 5/1954 | Eidenberg et al. | 106—65 |
| 3,026,210 | 3/1962 | Coble | 106—65 |
| 3,311,482 | 3/1967 | Klinger et al. | 106—65 |
| 3,377,176 | 4/1968 | Wolkodoff et al. | 106—65 |

FOREIGN PATENTS

| | | | |
|---|---|---|---|
| 509,516 | 7/1939 | Great Britain | 106—65 |

OTHER REFERENCES

Cahoon et al.: Sintering and Grain Growth of Alpha-Alumina, J. Am. Cer. Soc., vol. 39, 1956, pp. 337–344.

JAMES E. POER, Primary Examiner

U.S. Cl. X.R.

106—39